United States Patent
Koch et al.

(10) Patent No.: US 8,411,689 B2
(45) Date of Patent: Apr. 2, 2013

(54) FAULT-TOLERANT, FRAME-BASED COMMUNICATION SYSTEM

(75) Inventors: Rolland Mitchell Koch, Pasadena, CA (US); Daniel Bailey Hiranandani, Santa Barbara, CA (US); William Stuart Sechrist, Simi Valley, CA (US)

(73) Assignee: Aerovironment, Inc., Monrovia, CA (US)

( * ) Notice: Subject to any disclaimer, the term of this patent is extended or adjusted under 35 U.S.C. 154(b) by 266 days.

(21) Appl. No.: 12/889,284

(22) Filed: Sep. 23, 2010

(65) Prior Publication Data

US 2011/0069712 A1    Mar. 24, 2011

Related U.S. Application Data

(63) Continuation of application No. PCT/US2010/049893, filed on Sep. 22, 2010.

(60) Provisional application No. 61/245,207, filed on Sep. 23, 2009.

(51) Int. Cl.
  *G06F 15/16* (2006.01)
  *H04L 12/56* (2006.01)
  *H04L 12/28* (2006.01)
  *H04L 12/50* (2006.01)

(52) U.S. Cl. ........ 370/400; 370/229; 370/360; 370/389; 370/392; 370/395.3; 370/395.31; 709/235; 709/236

(58) Field of Classification Search .......... 709/235–236; 370/229, 360, 389, 392, 395.3, 395.31, 400
See application file for complete search history.

(56) References Cited

U.S. PATENT DOCUMENTS

| | | | |
|---|---|---|---|
| 2004/0028058 A1* | 2/2004 | Katoh | 370/395.53 |
| 2004/0039832 A1* | 2/2004 | Hidaka et al. | 709/230 |
| 2004/0047353 A1* | 3/2004 | Umayabashi et al. | 370/395.63 |
| 2005/0138171 A1* | 6/2005 | Slaight | 709/225 |
| 2006/0002385 A1* | 1/2006 | Johnsen et al. | 370/389 |
| 2009/0010200 A1* | 1/2009 | Lauer et al. | 370/316 |
| 2009/0073989 A1* | 3/2009 | Cai et al. | 370/395.53 |
| 2010/0278044 A1* | 11/2010 | Wong et al. | 370/235 |
| 2011/0032825 A1* | 2/2011 | Minkenberg et al. | 370/238 |

OTHER PUBLICATIONS

International Search Report for Serial No. PCT/US2010/049893 dated Nov. 19, 2010.

* cited by examiner

*Primary Examiner* — Andrew Lai
*Assistant Examiner* — Albert Shih
(74) *Attorney, Agent, or Firm* — Brooks Acordia IP Law, PC; Eric Aagaard (57) ABSTRACT

A packet-switched, fault-tolerant, vehicle communication internetwork (100, 400, 500) comprising port-based VLANs. Two or more VLANs are embodied where a source node (110, 410, 510,610) comprises two or more network interface circuits (130,140, 415,425, 515,525, 630,640), and where looping is precluded via specific VLAN tagging and switch ports (131-134, 200, 300, 420, 430, 435, 445, 455, 465, 535, 540, 545, 560, 575, 585, associated with at least one specific VLAN. A destination node (120, 440, 450, 460, 570, 580, 590, 620) may feedback packets to the source node via a general VLAN tag along pathways associated with the two or more specific outgoing VLAN tags.

33 Claims, 8 Drawing Sheets

FIG. 7B

FAULT-TOLERANT, FRAME-BASED COMMUNICATION SYSTEM

CROSS-REFERENCE TO RELATED APPLICATIONS

This application is a continuation of International Application No. PCT/US2010/49893 filed Sep. 22, 2010, which claims the benefit of U.S. Provisional application No. 61/245,207 filed Sep. 23, 2009, the disclosures of which are incorporated by reference herein for all purposes.

TECHNICAL FIELD

Embodiments include a packet-switched network comprising a frame-based communication system, and particularly pertain to port-based VLANs in a fault-tolerant communication system.

BACKGROUND

The Internet Protocol may use Ethernet frames where an Ethernet frame format may include a media access control (MAC) header comprising a destination MAC address, a source MAC address and a data payload.

SUMMARY

A frame-internal field may be used for tagging the frame with virtual local area network (VLAN) information. Embodiments may include a system, or internetwork, comprising three or more switching nodes disposed between a source node and a destination node wherein: (a) a first switching node of the three or more switching nodes may be configured to tag a frame received from the source node with a first virtual local area network (VLAN) designator and output via at least one port the frame tagged with the first VLAN designator; (b) a second switching node of the three or more switching nodes may be configured to tag a frame received from the source node with a second VLAN designator, and output via at least one port the frame tagged with the second VLAN designator; and (c) a third switching node (FIG. 3) of the three or more switching nodes may be configured to exclude from output, via at least one port, a received frame having the first V-LAN designator; and wherein the destination node may be configured to receive: (i) at least one of: a frame having the first VLAN designator and a frame having the second VLAN designator; or (ii) at least one of: a first frame stripped of its first VLAN designator and/or a second frame stripped of its second VLAN designator.

The source node may comprise a near real-time controller and the destination node may comprise a gateway and at least one of: (1) an effector responsive to payload information of the received frames; (2) a radio frequency transmitter; and (3) a flight sensor.

BRIEF DESCRIPTION OF THE DRAWINGS

Embodiments are illustrated by way of example and not limitation in the figures of the accompanying drawings, and in which.

DETAILED DESCRIPTION

Reference is made to the drawings that depict exemplary embodiments. Embodiments include deterministic, non-looping, packet routing systems and networks that may employ aspects of virtual local area networking A virtual local area network (VLAN) may be embodied as a level two of the Open Systems Interconnection (OSI) model, i.e., the data link layer, where data may be portioned according to frame, and reference may be made via media access control (MAC). A VLAN may exploit a tag or indicator available in the Ethernet packet or a frame to discern the VLAN to which a packet may be associated. Exemplary VLAN embodiments may be used to filter data traffic from specific ports of switches. Exemplary VLAN embodiments may perform the filtering function independent of communication type such as unicast and multicast, and transport protocols such as Transmission Control Protocol (TCP) and User Datagram Protocol (UDP). VLAN routing configurations may be programmed into the non-volatile memory of each of a plurality of network switches. A network controller, a network master, or an OSI Layer 3 device, may be a node having a processor configured to dynamically adjust the port routing via VLAN management tables, e.g., based on the ping responses of network elements.

Figure 1:
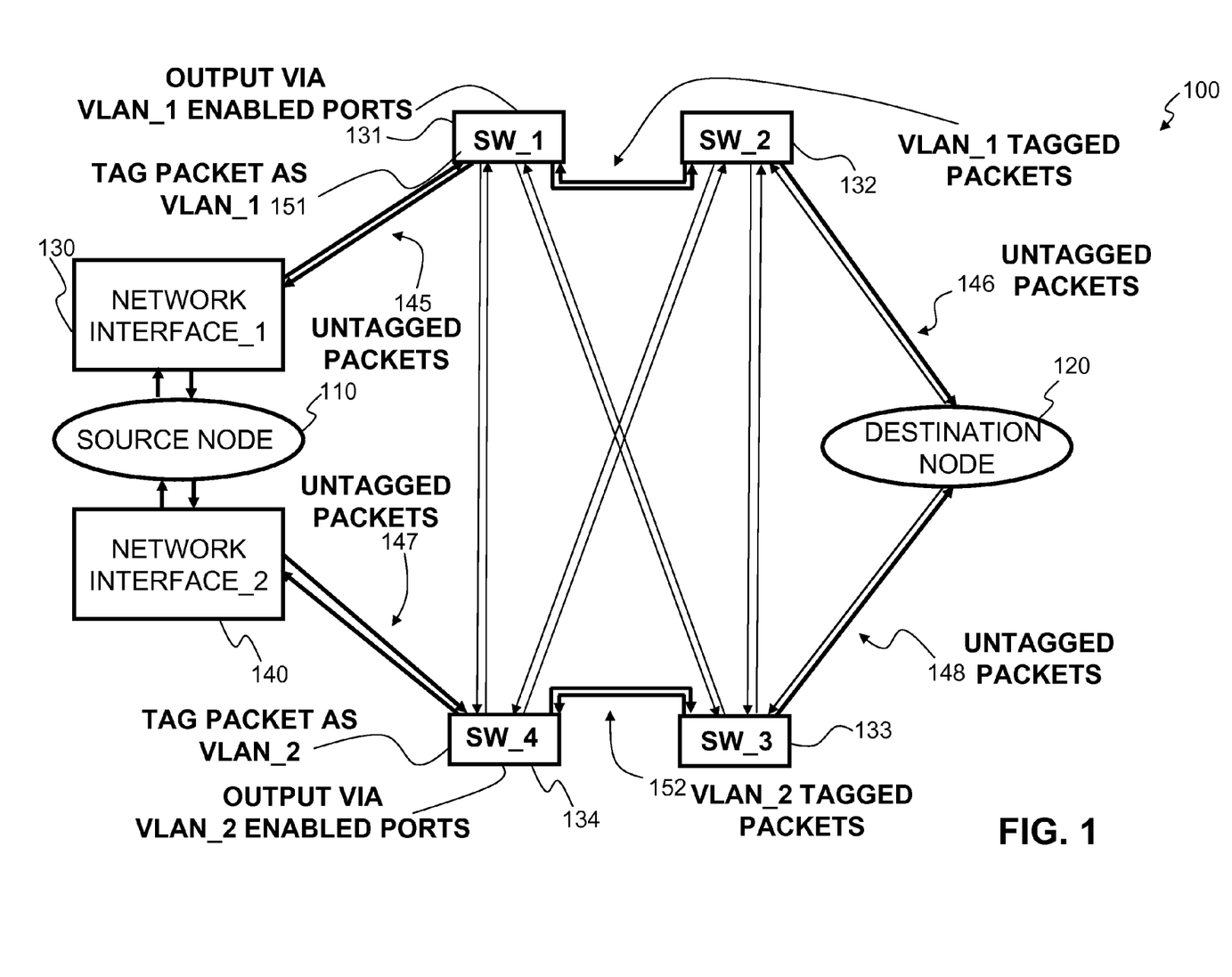
FIG. 1 is an exemplary top-level system diagram.

FIG. 1 is an exemplary top-level system diagram 100. A processor is defined herein as a computer or computing device where the computer device includes a central processing unit (CPU) and addressable memory, and where the computing device may be configured by way of executable machine-readable instructions, circuitry, or combinations of both, to function as a special computing device. A network may comprise a source node 110 comprising a processor, a destination node 120 comprising a processor, and one or more network links interposed between the nodes, and shown by example in FIG. 1 as directional arrows or pairs of directional arrows. The source node 110 may generate a message such as a command intended for a destination node 120. The exemplary message may be prepared and transmitted by a plurality of network interface cards 130, 140. In the exemplary diagram of FIG. 1, the source node 110 interfaces with the network via the two network interface devices 130, 140 or computer circuit boards that may be network interface cards (NICs). Each NIC may then connect to a routing switch 131-134, e.g., a switch having a table for directed port routing. In the exemplary network of FIG. 1, the first NIC 130 may transmit to a first switch (SW_1) 131 and the first switch may transmit to a second switch (SW_2) 132. Also in the exemplary network of FIG. 1, the second NIC 140 may transmit the same messages as the first NIC 130 to a fourth switch (SW_4) 134 and the fourth switch (SW_4) may transmit to a third switch (SW_3) 133. The second switch (SW_2) 132 and the third switch (SW_3) 133 may transmit packets/datagrams to the destination node. Accordingly, the destination node may receive redundant messages from one source node via two or more channels. In some embodiments, a switch may receive redundant messages from one source node 110 via two or more channels, e.g., VLAN_1 and VLAN_2, remove the VLAN tags, reconcile the redundancy in the packets, and provide the reconciled and untagged packets to the destination node 120.

Figure 2:
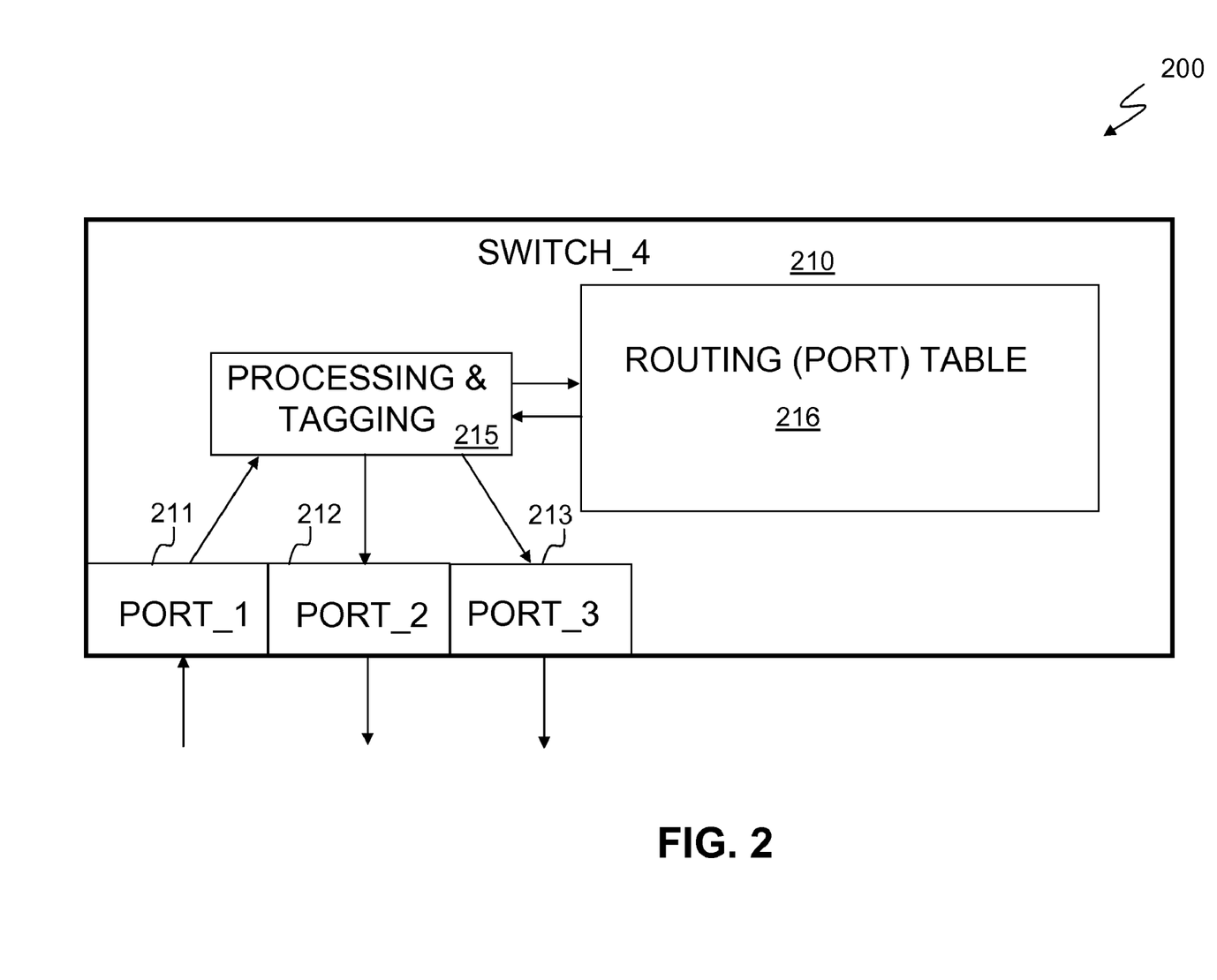
FIG. 2 is top-level functional block diagram of an exemplary switch.

FIG. 2 is top-level functional block diagram of an exemplary switch 200. The switching node 210 of FIG. 2 is depicted as configured to tag 215 a frame received via port_1 211 from the source node 110 with a second VLAN (e.g., VLAN_2) designator, and, with reference to a routing table 216, output via at least one port 211-213 the frame tagged with the second VLAN designator. Referring to FIGS. 1 and 2, port-based VLANs include nodes on the network that may send standard packets without VLAN tags, e.g., as untagged Ethernet packets 145,147. When the untagged packet 145 arrives at its first network switch port (SW_1) 131, it may be examined. If the examining switch finds no tag on the packet, it may attach the tag assigned to the particular port 151 receiving the untagged packet 145, e.g., VLAN_1 may be the tag assigned for packets received via port number one 211. The examining switch may determine via processing 215 and by referring to the port-routing table 216, which of its other outgoing ports, i.e., one or more ports other than the instant receiving port, are also configured for VLAN_1. For each switch port of the examining port that is configured for VLAN_1, the now tagged packet is forwarded, e.g., to port_2 212 and port_3 213. Upon arrival at a next, in this example the second, network switch (SW_2) 132, the packet may be examined. If the second network switch 132 discerns the VLAN_1 tag, then for each switch port of the second examining port that is configured for VLAN_1, the VLAN_1 tagged packet is forwarded. In some embodiments, the destination node comprises a receive port and circuitry configured to remove the VLAN tags of the received packets.

Figure 3:
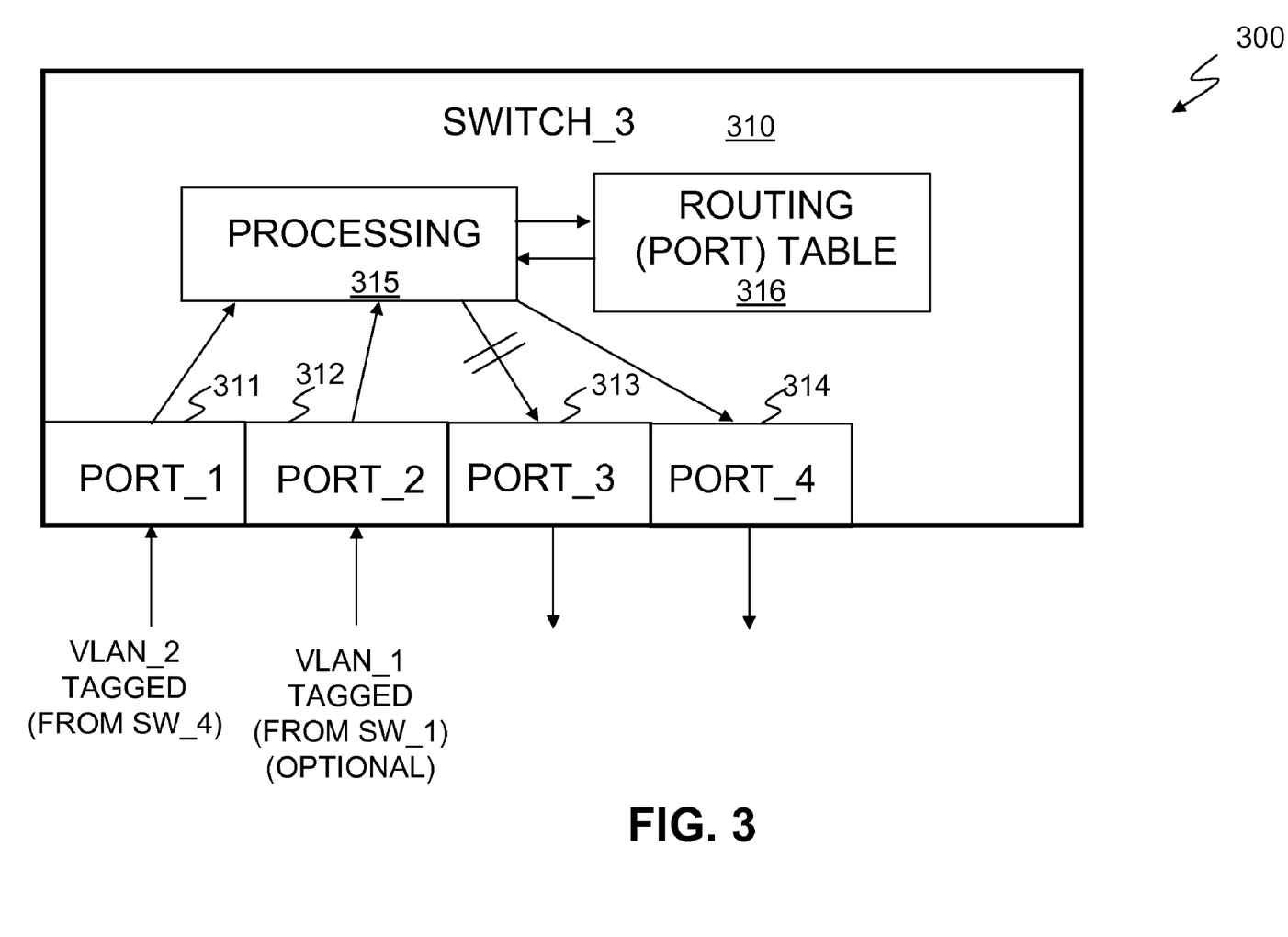
FIG. 3 is top-level functional block diagram of an exemplary switch.

FIG. 3 is top-level functional block diagram of an exemplary switch 300. The exemplary switching node 310 of FIG. 3 is shown configured to exclude from output, via at least one port 311-314, a received frame having the first VLAN designator (e.g., VLAN_1), received via port_2 312. For example, switching node 310 may determine via processing 315 and with reference to a port-routing table 316, that the frame having the first VLAN designator may be transmitted via port_4 314, but not via port_3 313. Referring to both FIGS. 1 and 3, port_1 may receive a packet tagged as VLAN_2 from SW_4 and a packet tagged as VLAN_1 from SW_1. The switching node 310 may be configured to only output VLAN_2 tagged packets via port_4 314. Switching node 310 may output the VLAN2 tagged frames to a destination node where the tags may be removed and the packets further processed. Accordingly, embodiments of the networked system may include one or more destination switch nodes where a destination node switch is a node having a direct link to a destination node 120, i.e., no additional switch node is interposed between a destination switch node and the destination node. Upon arrival at a destination switch node, in some embodiments, the VLAN_1 or VLAN_2 tag may be removed from the packet and the packet may then be forwarded to the destination node 120, also shown in FIG. 1 as untagged packets 146,148.

Figure 4:
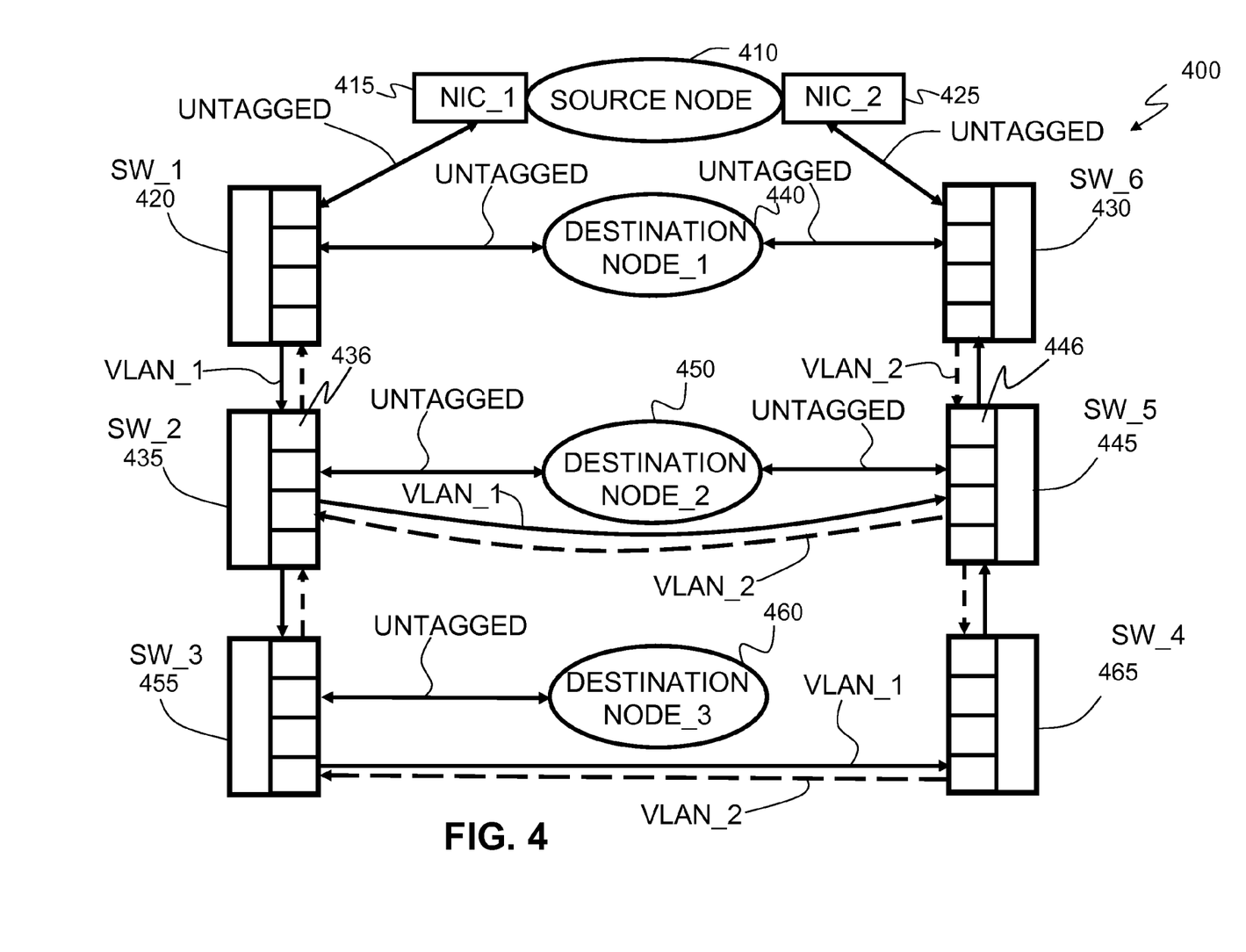
FIG. 4 is an exemplary top-level system diagram of an embodiment.

FIG. 4 is an exemplary top-level block diagram of an internetwork 400 where a source node 410 may have two NIC cards 415, 425 to interface with respective network segments. Each NIC interfaces with a respective switch: NIC_1 415 with SW_1 420, and NIC_2 425 with SW_6 430. Each switch is shown having four ports and may have more or less to support various embodiments. By this illustrative network: a first destination node (Destination Node_1) 440 may receive packets from both SW_1 420 and SW_6 430; a second destination node (Destination Node_2) 450 may receive packets from both SW_2 435 and SW_5 445; and a third destination node (Destination Node_3) 460 may receive packets from SW_3 455, for example. In this embodiment, SW_6 430 is configured to not output packets having the VLAN_1 tag and SW_1 420 is configured to not output packets having the VLAN_2 tag. SW_2 435 is shown configured to have only one port 436 that may output packets having the VLAN_2 tag, and SW_5 445 is depicted as having only one port 446 that may output packets having the VLAN_1 tag. Accordingly, the exemplary network does not loop packets of either VLAN tag for this example. That is in some embodiments of the internetwork, at least one of the switching nodes (SW_1 to SW_6) may be configured to block transmission of a received packet comprising a frame tagged with a first VLAN designator, i.e., the VLAN_1 tag, and thereby foreclose the possibility of a looping counter clockwise transmission (of FIG. 4). Likewise in some embodiments of the internetwork, at least one of the switching nodes, (SW_1 to SW_6) may be configured to block transmission of a received packet comprising a frame tagged with a second VLAN designator, i.e., the VLAN_2 tag, and thereby foreclose the possibility of a looping clockwise transmission (of FIG. 4, the dashed arrow pathways).

Figure 5:
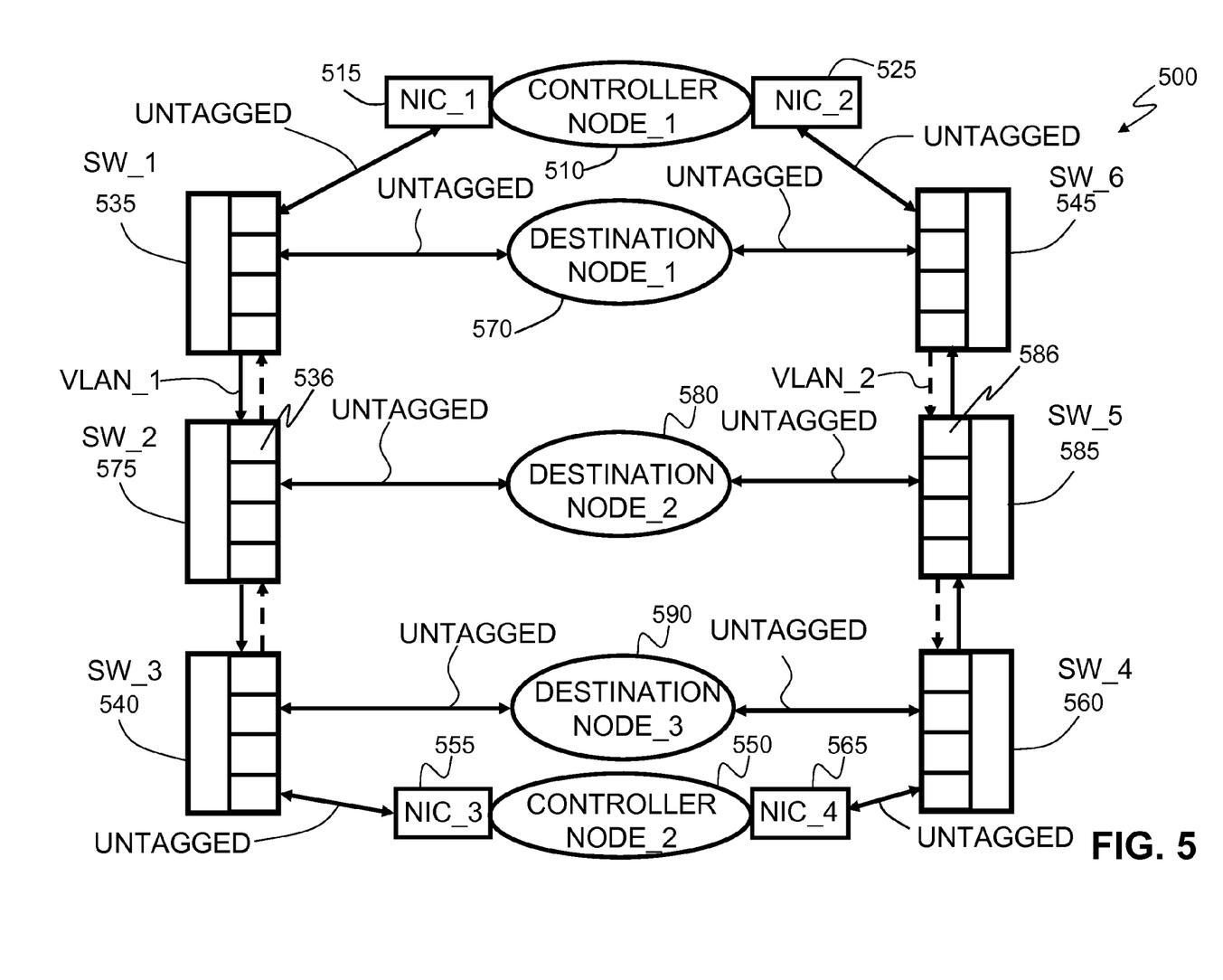
FIG. 5 is an exemplary top-level system diagram of an embodiment.

FIG. 5 is an exemplary top-level block diagram of an internetwork 500 where a first controller node 510 may have two NIC cards 515, 525 to interface with respective network segments. Each NIC interfaces with a respective switch: NIC_1 515 with SW_1 535 and NIC_2 525 with SW_6 545. In addition, a second controller node 550 may have two NIC cards 555, 565 to interface with respective network segments. Each NIC interfaces with a respective switch: NIC_3 555 with SW_3 540 and NIC_4 565 with SW_4 560. Each switch is shown having four ports and may have more or less to support various embodiments. By this illustrative network: a first destination node (Destination Node_1) 570 may receive packets from both SW_1 535 and SW_6 545; a second destination node (Destination Node_2) 580 may receive packets from both SW_2 575 and SW_5 585; and a third destination node (Destination Node_3) 590 may receive packets from both SW_3 540 and SW_4 560. In this embodiment, SW_6 545 is configured to not output packets having the VLAN_1 tag and SW_1 535 is configured to not output packets having the VLAN_2 tag. SW_2 575 is shown configured to have only one port 536 that may output packets having the VLAN_2 tag, and SW_5 585 is shown having only one port 586 that may output packets having the VLAN_1 tag. Accordingly, the exemplary network does not loop packets of either VLAN tag for this example. In addition, the first controller node 510 and the second controller node 550 may be preset or arbitrate the role of a master network controller with the other controller node tracking the network activity, monitoring network component/node health signals and/or metrics, and configured to replace the current network controller as the master network controller based on an external input and/or an event exceeding a pre-defined network health status threshold.

Figure 6:
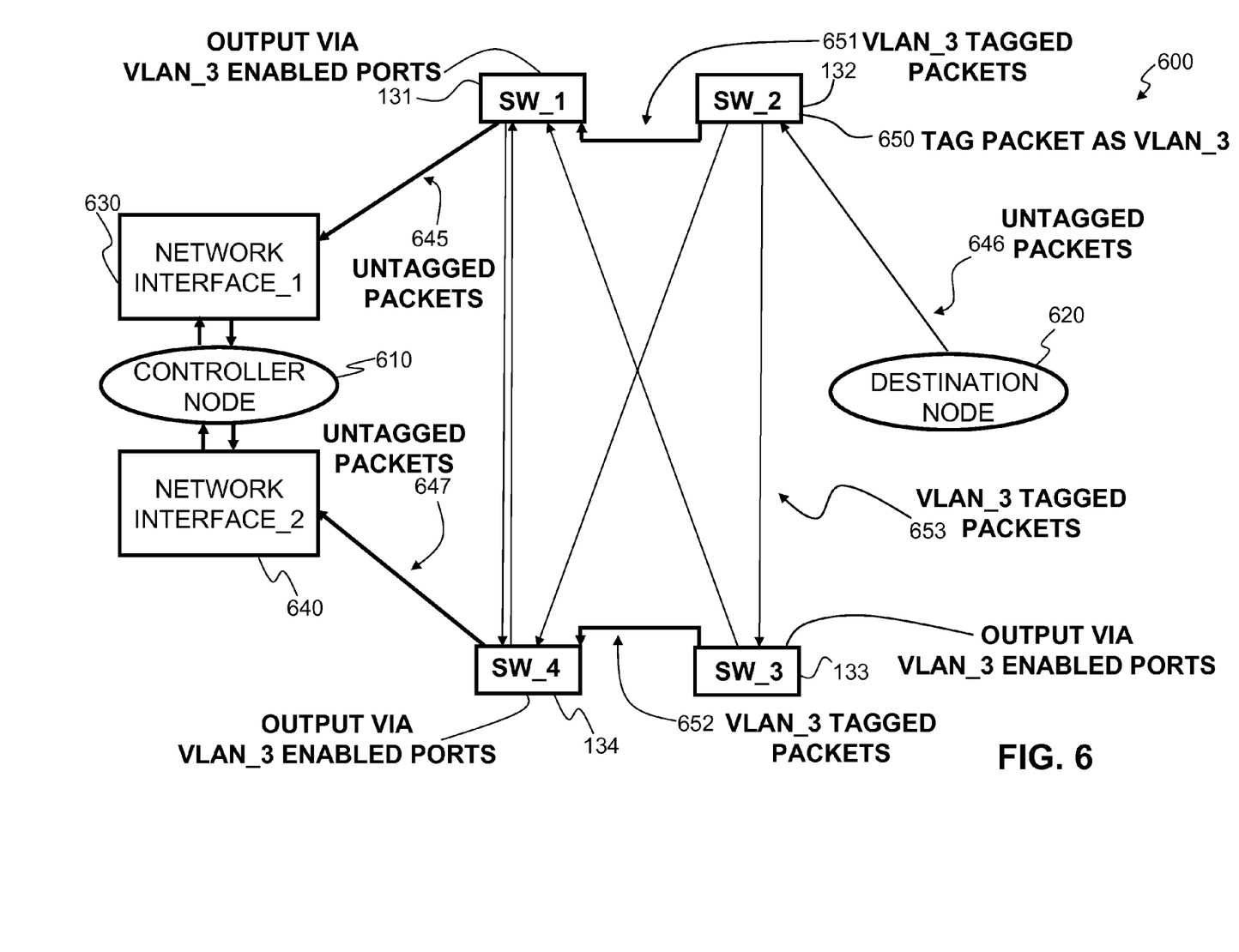
FIG. 6 is another exemplary top-level system diagram.

FIG. 6 is an exemplary top-level system diagram 600 similar to FIG. 1. FIG. 6 depicts a communication to controller node 610 comprising a processor, a destination node 620 comprising a processor, and a network link interposed between the nodes. The destination node 620 may generate a message such as a feedback signal for the controller node 610. The exemplary message may be prepared and tagged 650 with a third VLAN tag, e.g., VLAN_3, by circuitry of the destination node 620 or, in this example, by the proximate switch, SW_2 132, functioning in this example as a destination node switch. The tagged message may be transmitted 651-653 via routing switches, e.g., SW_1 131, SW_3 133, and/or SW_4 134, and received by a plurality of network interface cards 630, 640 of the controller node 610. Accordingly, the controller node may receive redundant messages from one destination node 620 via two or more channels, i.e., channels that permit the routing of messages tagged with VLAN_3. In some embodiments, a switch may receive redundant messages from one destination node via two or more channels, remove the VLAN_3 tags, reconcile the redundancy in the packets, and provide the reconciled and untagged packets to the controller node 610. Accordingly, network interface_1 630 may receive untagged packets 645 from SW_1 131, and network interface_2 640 may receive untagged packets 647 from SW_4 134.

FIG. 6 also depicts a network structure supportive of redundant paths for destination nodes, such as actuator or sensor nodes having a single physical connection to the network, e.g., an untagged packet path 646. As disclosed in FIG. 1, the network configuration supports a message path from each of two interfaces (NICs) 130,140 on the controller node 110 that may be established using two one-directional VLANs, i.e., two unidirectional of the asymmetrical VLAN configuration—VLAN_1 and VLAN_2. The configuration of FIG. 1 allows for directing the message packets from the two interfaces (NICs) of the controller node 110 over different paths through the network of switches 131-134 between the controller node 110 and the actuator/sensor 620. The two paths selected for the packets may not be optimized for number of hops or speed, but rather may be selected to achieve maximum probability of a path remaining functional in the event the other path experiences a disruption. This configuration uses two VLANs to achieve performance continuity and transmitted data integrity in the face of a single point failure, e.g., a failure in SW_1 131, SW_3 133, or SW_4 134.

FIG. 6 depicts the return paths from the actuator/sensor 620 to the two physical interfaces (NICs) 630,640 on the controller 610 that may be established by use of a third VLAN, e.g., VLAN_3. The return packets, from the destination node 620 to the controller node 610, may be broadcast from the actuator/sensor 620, and directed along two or more paths back to the two interfaces (NICs) 630, 640 of the controller 610 by use of the third uni-directional VLAN—in a direction opposite that of the asymmetrical VLAN configuration. The two or more paths selected for the packets may not be optimized for number of hops or speed, but rather may be selected to achieve maximum probability of a path remaining functional in the event the other path experiences a disruption. Accordingly, this return path embodiment uses at least one additional VLAN. The path from the first NIC 630 to the destination node 620 is determined by VLAN_1. The path from the second NIC 640 to the destination node 620 is determined by VLAN_2. The return paths from destination node 620 to both the first NIC 630 and the second NIC 640 are determined by VLAN_3. The tagging of the packets with the VLAN_3 tag can be performed by the actuator/sensor 620 or, in this example, by SW_2 132 upon arrival at the switch port. The learning and subsequent lookup of which physical port the switch may send a packet of a return message in order to reach the Ethernet addresses of the NICs may be independent of the VLAN tag. Return routing independent of the original outgoing VLAN tag allows return packets of either outgoing VLAN to be routed back to the correct port, e.g., via the VLAN_3 tag.

Figure 7A:
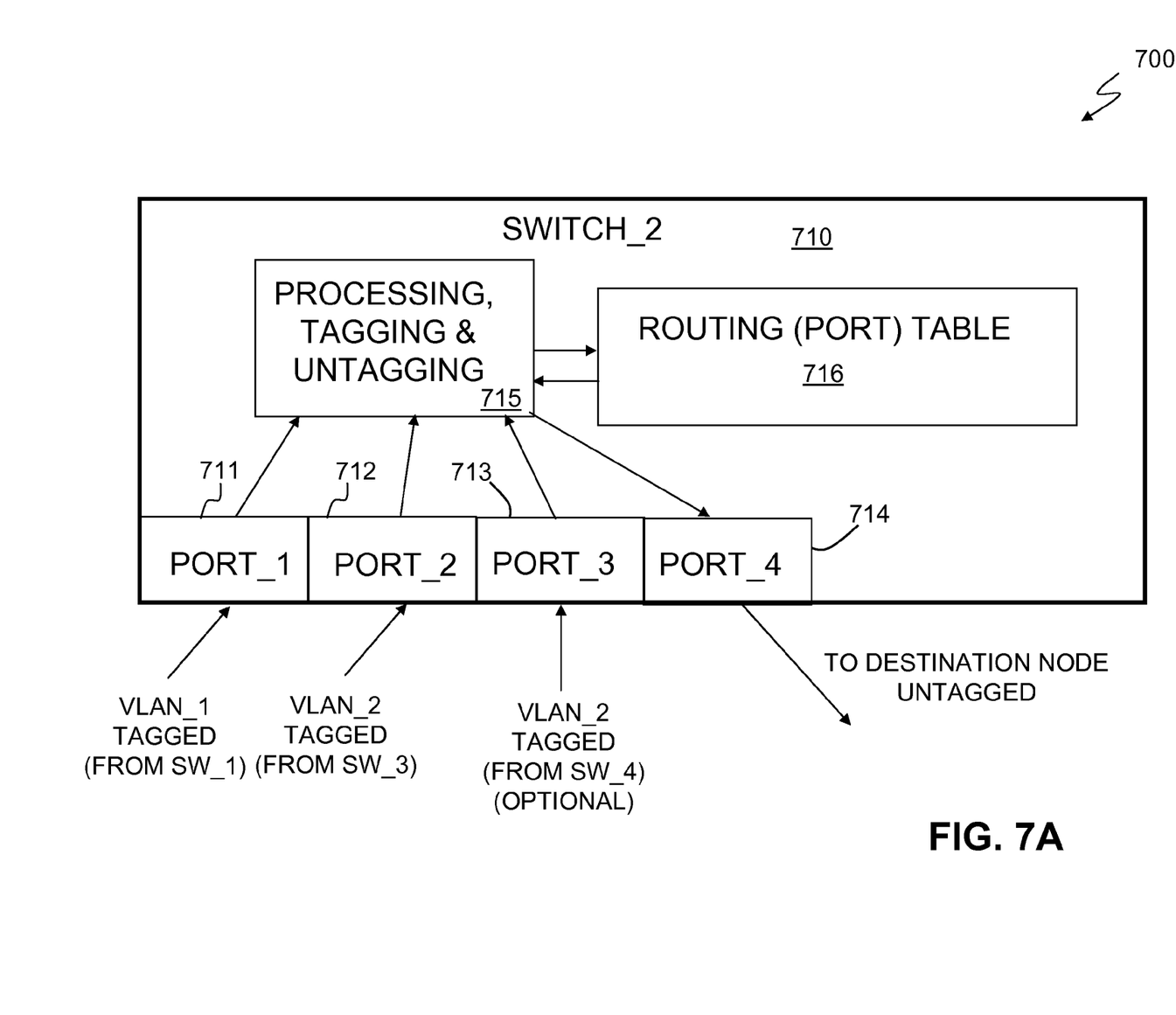
FIG. 7A is a top-level functional block diagram of an exemplary switch.

FIG. 7A is top-level functional block diagram of an exemplary switch 700. The exemplary switching node 710 of FIG. 7A is shown configured as a destination node so that upon arrival at a destination switch node, in some embodiments, the VLAN_1 or VLAN_2 tag may be removed from the packet and the packet may then be forwarded to the destination node. In this example and also with reference to FIG. 1, the switching node 710 may receive at port_1 711 a packet having a VLAN_1 tag from SW_1 131, may receive at port_2 712 a packet having a VLAN_2 tag from SW_3 133, and optionally may receive at a port_3 713 a packet having a VLAN_2 tag from SW_4 134. By processing and untagging 715 and by making reference to the port-routing table 716, the switching node may output the untagged frames via port_4 714 to the destination node.

Figure 7B:
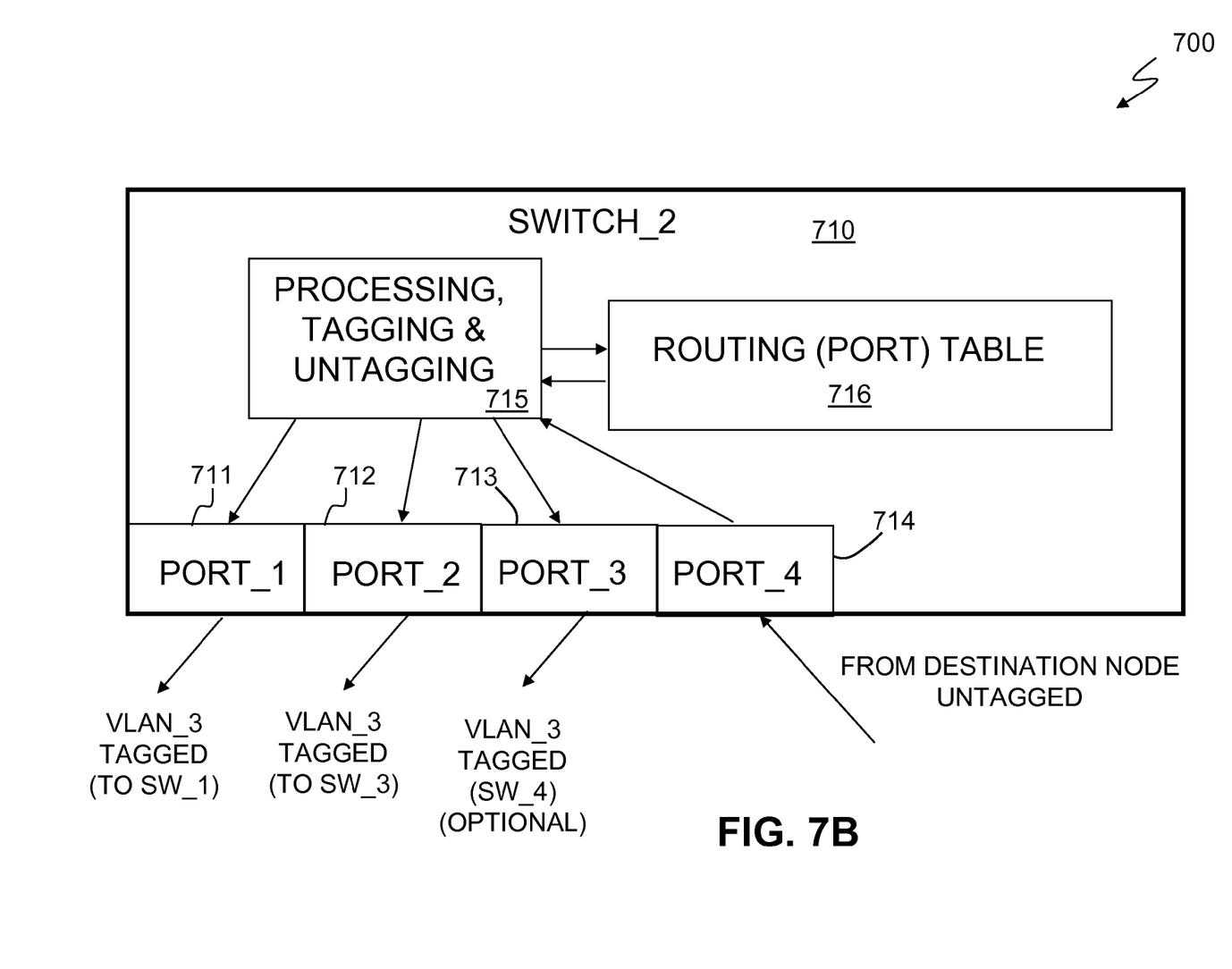
FIG. 7B is a top-level functional block diagram of an exemplary switch.

FIG. 7B is top-level functional block diagram of an exemplary switch 700 of FIG. 7A where the switching node 710 is depicted as receiving an untagged packet from the destination node at port_4 714. By processing and tagging 715, the switching node 710 is depicted as outputting a packet via two or more ports: a VLAN_3 tagged packet to SW_1 via port_1 711; a VLAN_3 tagged packet to SW_3 via port_2 712; and optionally a VLAN_3 tagged packet to SW_4 via port_3 713.

The exemplary networks may employ a lightweight transmission protocol such as the User Datagram Protocol (UDP). A destination node may interface with a gateway allowing for communication with devices such as sensors (e.g., attitude, altitudes, temperature, pressure, Global Positioning Satellite receiver outputs, and/or strap-down navigation sensors), radio transceivers, engine controllers, and actuating devices. The exemplary network may be embodied as a real-time communication network as part of a vehicle such as a land vehicle, an air vehicle, and/or a sea-going vehicle.

Embodiments may readily scale up where a controller node may comprise three or more network interface circuits and accordingly three or more VLAN outgoing pathways may be configured. The return path may remain as a single VLAN that functions as a return superset of the outgoing VLANs, or additional return VLAN pathways may be configured.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. An internetwork comprising three or more switching nodes disposed between a source node and a destination node wherein:
   a first switching node of the three or more switching nodes is configured to tag a frame received from the source node with a first virtual local area network (VLAN) designator and output via at least one port the frame tagged with the first VLAN designator, said first switching node having a first table for directed port routing;
   a second switching node of the three or more switching nodes is configured to tag a frame received from the source node with a second VLAN designator and output via at least one port the frame tagged with the second VLAN designator, said second switching node having a second table for directed port routing; and
   a third switching node of the three or more switching nodes is configured to exclude from output, via at least one port, a received frame having the first VLAN designator; and wherein the destination node is configured to receive at least one of: a frame having the first VLAN designator and a frame having the second VLAN designator.

2. The internetwork of claim 1 wherein at least one of: the first switching node, the second switching node, and the third switching node, is configured to block transmission of a received packet comprising a frame tagged with a first VLAN designator.

3. The internetwork of claim 1 wherein at least one of: the first switching node, the second switching node, and the third switching node, is configured to block transmission of a received packet comprising a frame tagged with a second VLAN designator.

4. The internetwork of claim 1 wherein the source node comprises a near real-time controller.

5. The internetwork of claim 1 wherein the source node comprises a near real-time controller and a first network interface circuit in communicative link with the first switching node and a second network interface circuit in communicative link with the second switching node.

6. The internetwork of claim 1 wherein the destination node comprises a gateway and an effector responsive to payload information of the received frames.

7. The internetwork of claim 1 wherein the destination node comprises a gateway and a radio frequency transmitter.

8. The internetwork of claim 1 wherein the destination node comprises a gateway and a flight sensor.

9. An internetwork comprising three or more switching nodes disposed between a source node and a destination node wherein:
   the source node comprises: (a) a near real-time controller; (b) a first network interface circuit, in communicative link with the first switching node, the first network interface circuit configured to tag a frame with a first virtual local area network (VLAN) designator; (c) and a second network interface card in communicative link with the second switching node, the second network interface circuit configured to tag a frame with a second virtual local area network (VLAN) designator;
   a first switching node of the three or more switching nodes is configured to output via at least one port the frame tagged with the first VLAN designator, said first switching node having a first table for directed port routing;
   a second switching node of the three or more switching nodes is configured to output via at least one port the frame tagged with the second VLAN designator, said second switching node having a second table for directed port routing; and
   a third switching node of the three or more switching nodes is configured to exclude from output, via at least one port, a received frame having the first VLAN designator; and wherein the destination node is configured to receive at least one of: a frame having the first VLAN designator and a frame having the second VLAN designator.

10. The internetwork of claim 9 wherein at least one of: the first switching node, the second switching node, and the third switching node, is configured to block transmission of a received packet comprising a frame tagged with a first VLAN designator.

11. The internetwork of claim 9 wherein at least one of: the first switching node, the second switching node, and the third switching node, is configured to block transmission of a received packet comprising a frame tagged with a second VLAN designator.

12. The internetwork of claim 9 wherein the destination node comprises a gateway and an effector responsive to payload information of the received frames.

13. The internetwork of claim 9 wherein the destination node comprises a gateway and a radio frequency transmitter.

14. The internetwork of claim 9 wherein the destination node comprises a gateway and a flight sensor.

15. An internetwork comprising three or more switching nodes disposed between a source node and a destination node wherein:
   a first switching node of the three or more switching nodes is configured to tag a frame received from the source node with a first virtual local area network (VLAN) designator and output via at least one port the frame tagged with the first VLAN designator or a frame tagged with a third VLAN designator, said first switching node having a first table for directed port routing;
   a second switching node of the three or more switching nodes is configured to tag a frame received from the source node with a second VLAN designator and output via at least one port the frame tagged with the second VLAN designator or the third VLAN designator, said second switching node having a second table for directed port routing; and
   a third switching node of the three or more switching nodes is configured to exclude from output, via at least one port, a received frame having the first VLAN designator and to tag a frame received from the destination node with the third VLAN designator.

16. The internetwork of claim 15 wherein at least one of: the first switching node, the second switching node, and the third switching node, is configured to block transmission of a received packet comprising a frame tagged with a first VLAN designator.

17. The internetwork of claim 15 wherein at least one of: the first switching node, the second switching node, and the third switching node, is configured to block transmission of a received packet comprising a frame tagged with a second VLAN designator.

18. The internetwork of claim 15 wherein the source node comprises a near real-time controller.

19. The internetwork of claim 15 wherein the source node comprises a near real-time controller and a first network interface card in communicative link with the first switching node and a second network interface card in communicative link with the second switching node.

20. The internetwork of claim 15 wherein the destination node comprises a gateway and an effector responsive to payload information of the received frames.

21. The internetwork of claim 15 wherein the destination node comprises a gateway and a radio frequency transmitter.

22. The internetwork of claim 15 wherein the destination node comprises a gateway and a flight sensor.

23. An internetwork comprising three or more switching nodes disposed between a source node and a destination node wherein:
   the destination node comprising circuitry for tagging one or more frames with a third virtual local area network (VLAN) designator;
   a first switching node of the three or more switching nodes is configured to tag a frame received from the source node with a first virtual local area network (VLAN) designator and output via at least one port the frame tagged with the first VLAN designator or a frame tagged with the third VLAN designator, said first switching node having a first table for directed port routing;
   a second switching node of the three or more switching nodes is configured to tag a frame received from the source node with a second VLAN designator and output via at least one port the frame tagged with the second VLAN designator or the third VLAN designator, said second switching node having a second table for directed port routing; and a third switching node of the three or more switching nodes is configured to exclude from output, via at least one port, a received frame having the first VLAN designator.

24. The internetwork of claim 23 wherein at least one of: the first switching node, the second switching node, and the third switching node, is configured to block transmission of a received packet comprising a frame tagged with a first VLAN designator.

25. The internetwork of claim 23 wherein at least one of: the first switching node, the second switching node, and the third switching node, is configured to block transmission of a received packet comprising a frame tagged with a second VLAN designator.

26. The internetwork of claim 23 wherein the source node comprises a near real-time controller.

27. The internetwork of claim 23 wherein the source node comprises a near real-time controller and a first network interface card in communicative link with the first switching node and a second network interface card in communicative link with the second switching node.

28. The internetwork of claim 23 wherein the destination node comprises a gateway and an effector responsive to payload information of the received frames.

29. The internetwork of claim 23 wherein the destination node comprises a gateway and a radio frequency transmitter.

30. The internetwork of claim 23 wherein the destination node comprises a gateway and a flight sensor.

31. An internetwork comprising three or more routing switches disposed between a source node and a destination node, wherein:

a first routing switch of the three or more routing switches is configured to tag a frame received from the source node with a first virtual local area network (VLAN) designator and output via at least one port the frame tagged with the first VLAN designator, said first routing switch having a first table for directed port routing;

a second routing switch of the three or more routing switches is configured to tag a frame received from the source node with a second VLAN designator and output via at least one port the frame tagged with the second VLAN designator, said first routing switch connected to said second routing switch through a network link, said second routing switch having a second table for directed port routing; and a third routing switch of the three or more routing switches is configured to exclude from output, via at least one port, a received frame having the first VLAN designator; and wherein the destination node is configured to receive at least one of: a frame having the first VLAN designator and a frame having the second VLAN designator.

32. The internetwork of claim 31 wherein at least one of: the first routing switch, the second routing switch, and the third routing switch, is configured to block transmission of a received packet comprising a frame tagged with a first VLAN designator.

33. The internetwork of claim 31 wherein at least one of: the first routing switch, the second routing switch, and the third routing switch, is configured to block transmission of a received packet comprising a frame tagged with a second VLAN designator.

* * * * *